Oct. 5, 1965  N. G. ARTMAN  3,209,474
TRACTOR LOADER WITH PIVOTAL SCOOP PORTION
Original Filed Nov. 5, 1959  5 Sheets-Sheet 2

INVENTOR
NOEL G. ARTMAN
Paul O. Pippel
ATTORNEY

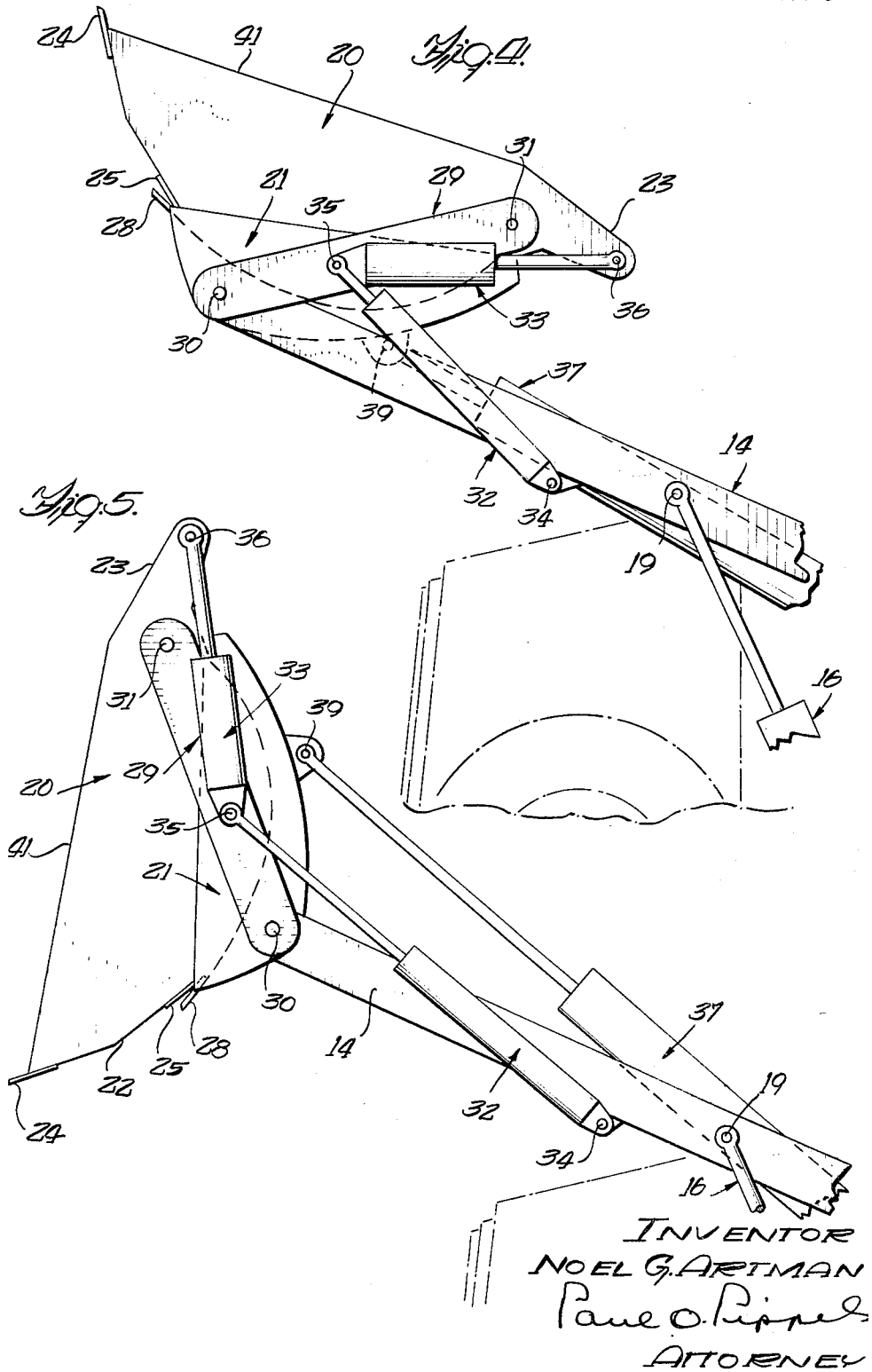

Oct. 5, 1965
N. G. ARTMAN
3,209,474
TRACTOR LOADER WITH PIVOTAL SCOOP PORTION
Original Filed Nov. 5, 1959
5 Sheets-Sheet 4
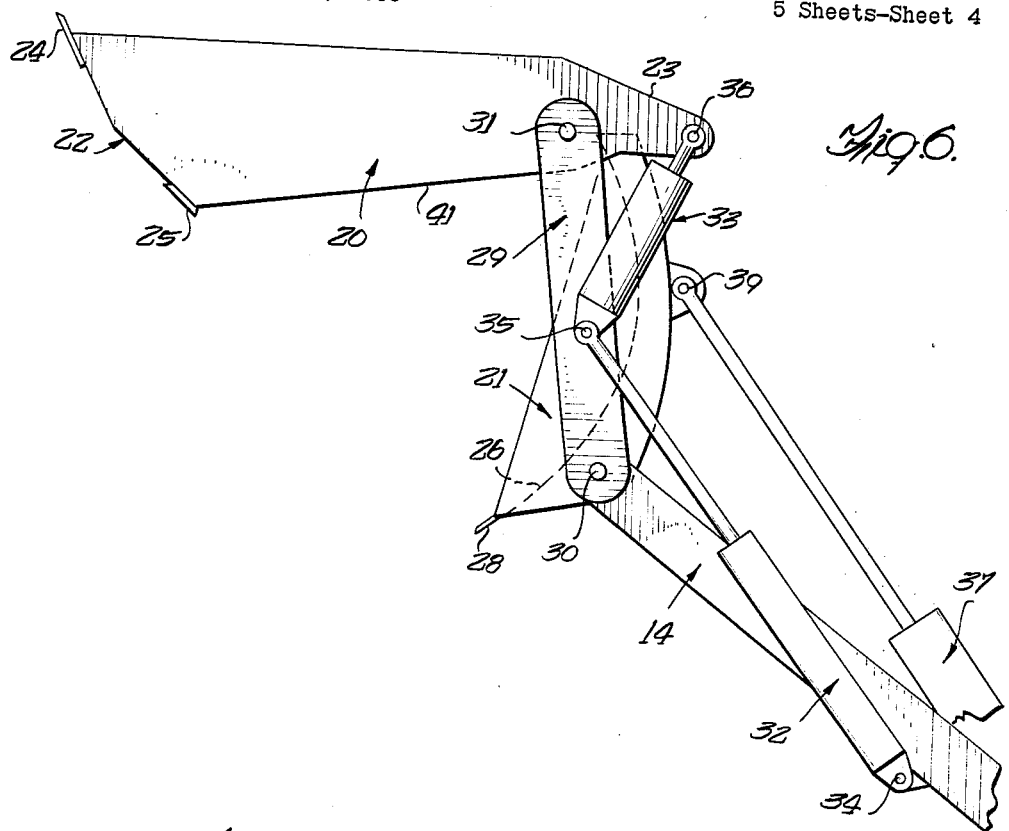
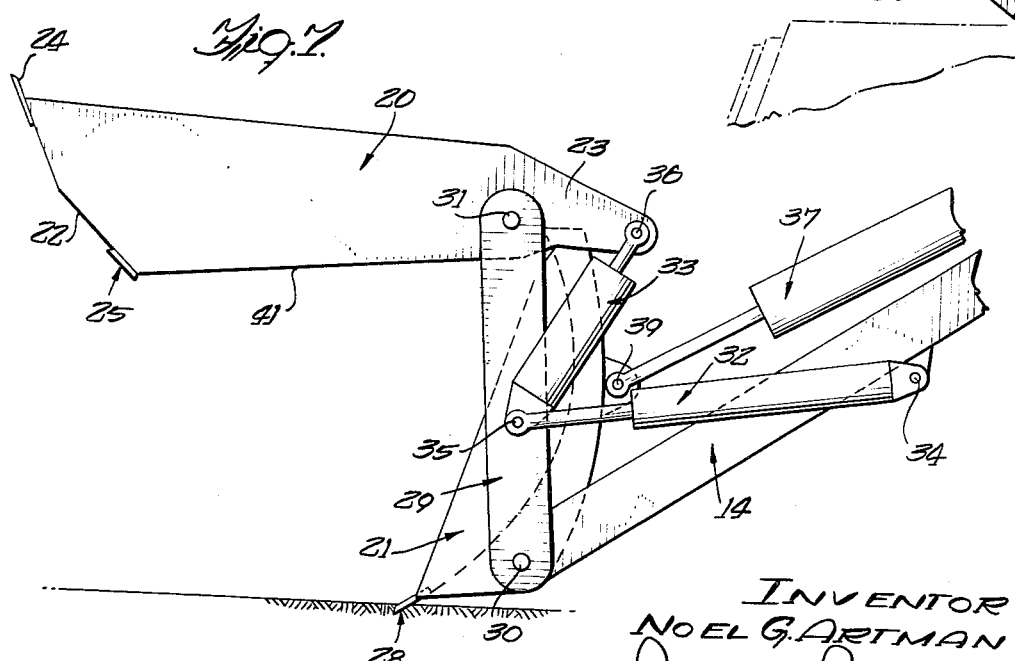
INVENTOR
NOEL G. ARTMAN
Paul O. Pippel
ATTORNEY

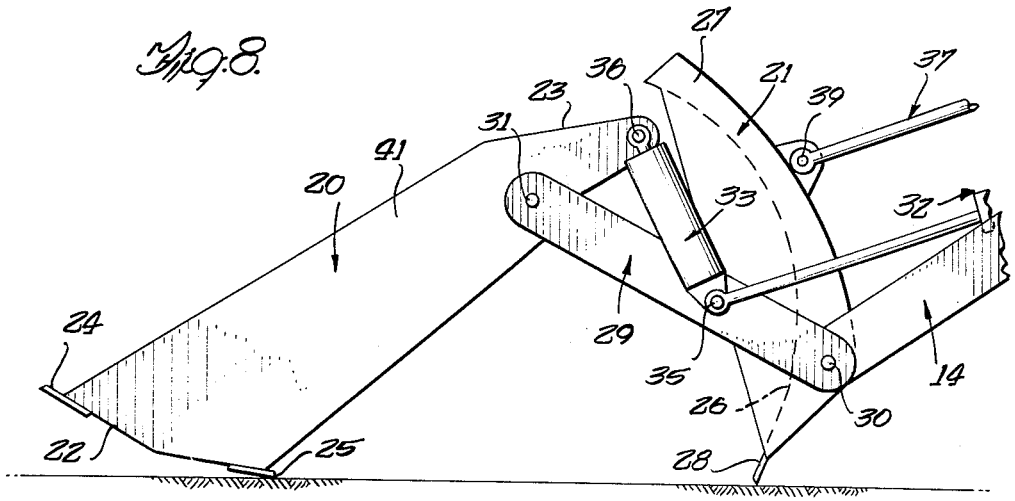
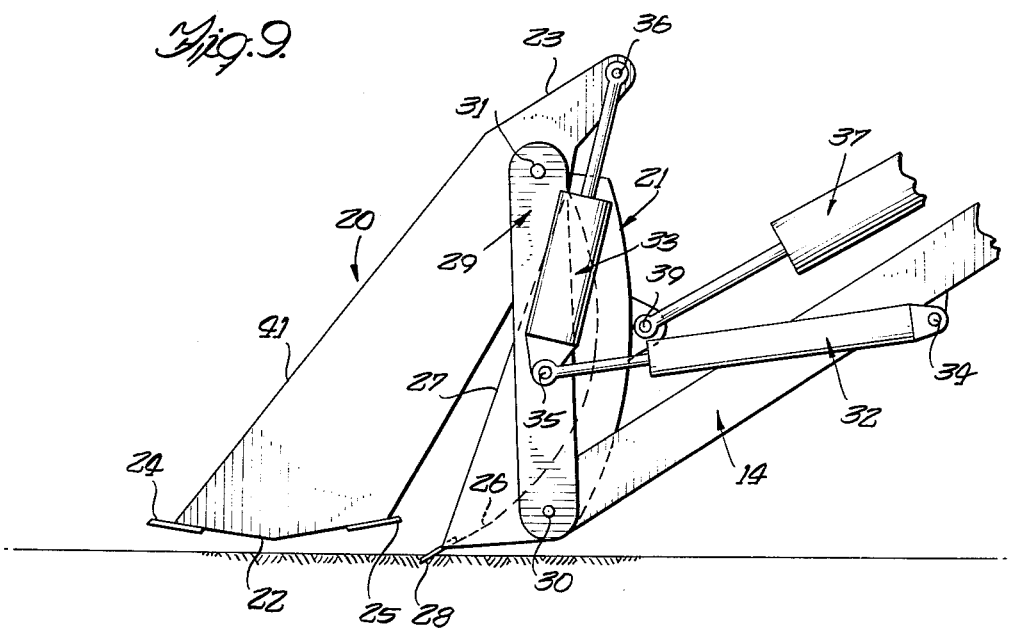

United States Patent Office 3,209,474
Patented Oct. 5, 1965

3,209,474
TRACTOR LOADER WITH PIVOTAL
SCOOP PORTION
Noel G. Artman, Geneva, Ill., assignor to International
Harvester Company, Chicago, Ill., a corporation of
New Jersey
Continuation of application Ser. No. 851,101, Nov. 5,
1959. This application Jan. 15, 1962, Ser. No. 168,010
10 Claims. (Cl. 37—117.5)

This application is a continuation of a parent application entitled "Tractor Loaders" by Noel G. Artman, and having Serial Number 851,101, filed November 5, 1959, now abandoned.

This invention relates generally to tractor loaders, and more specifically to an improved compound bucket arrangement providing multiple earth-moving or material handling functions.

As the art of tractor loaders has progressed, the need for multi-purpose tools has increased in order that economies in the number of different tools needed may be achieved and to provide greater versatility in the different earth-moving or material handling functions which any one tractor loader may perform. This demand has been partially met by a number of bucket attachments presently known in the art which generally have the disadvantages of insufficient versatility or inherent inefficiencies in the performance of one or more of the needed earth-moving functions. The basic desired or demanded functions are those of a conventional digging bucket, bulldozer, self-loading scraper, and a clam shell Further functions which are generally some combination of the four basic functions are those of spreading, backfilling, leveling, grading and backhoeing.

It is the object of the present invention to provide a tractor loader arrangement capable of efficiently performing substantially all of the noted basic and secondary functions in a more efficient manner and by certain construction thereof representing improvements over those presently known in the art.

It is a further object of the present invention to provide a compound bucket attachment for a front end type tractor loader which in one adjusted position thereof will provide a conventional bucket arrangement which may be used for efficiently digging at various levels and which may be used to pry out or break away a load from any material being worked, and which may be used to carry a load to a remote position with the bucket arrangement retaining substantially a maximum of the load in the bucket as the tractor is moved.

It is a further object of the present invention to provide a compound bucket arrangement as described immediately above which also may be adjusted to present an ideal bulldozing moldboard or blade to any material being worked with the normally desired different angles of penetration of the cutting edge thereof for bulldozing different materials and at various depths, and so that in the operation of the described arrangement there exists no interference of the portions of the bucket not being used in the bulldozing operation with the moldboard element.

It is a further object of the present invention to provide a tractor loader arrangement as described in the immediately preceding paragraph which is also easily adjustable to certain positions providing the arrangement of a self-loading scraper device with the various earth contacting surfaces being disposed so that efficient cutting and boiling of material into the confines of the bucket occurs as the tractor is moved forwardly with a minimum of power necessary relative to the quantity of earth or other material scraped into the bucket.

It is a further object of the present invention to provide a tractor loader arrangement such as described immediately above which is also adjustable to a position providing for an efficient clamshell action with the pertinent cutting edges being disposed for efficient clamming and with the possible maximum reach of the front scoop portion relative to the rear scoop portion being extremely wide relative to the size of the various bucket members.

Other objects and features of the present invention will be apparent upon perusal of the following specification and drawings of which:

FIGURE 4 is a partial enlarged view of the structure of FIGURE 1 with the bucket adjusted to the high lift carrying position;

FIGURE 5 is a partial enlarged view of the structure of FIGURE 1 with the bucket adjusted to one high lift dump position;

FIGURE 6 is a view similar to FIGURE 5 except that the bucket is further adjusted to another dump position;

FIGURE 7 is a partial enlarged view of the structure shown in FIGURE 1 with the bucket adjusted to the bulldozing position;

FIGURE 8 is a partial enlarged view of the structure shown in FIGURE 1 with the bucket adjusted to the clamming position; and FIGURE 9 is a partial enlarged view of the structure shown in FIGURE 1 with the bucket adjusted to the self-loading scraper position.

Figure 1:
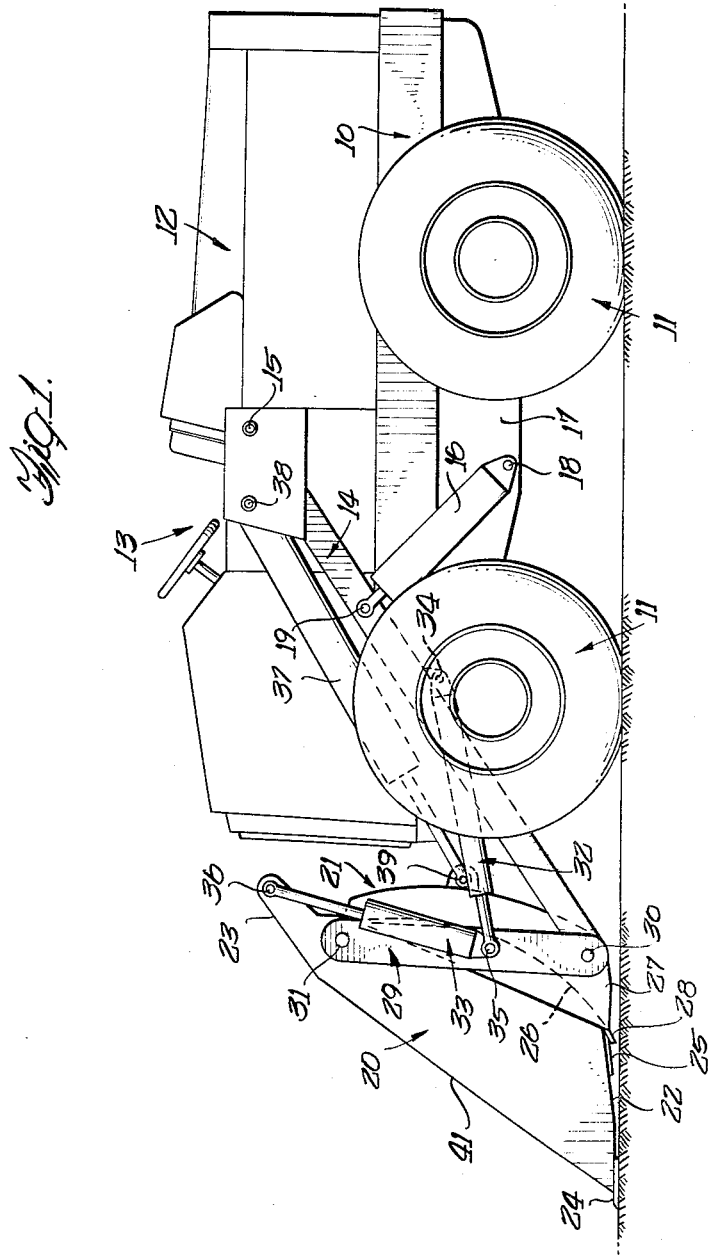
FIGURE 1 is a side elevational view of a front end type tractor loader constructed according to the present invention and with the bucket adjusted to the digging position at ground level.

The present embodiment is the preferred embodiment, but it is to be understood that changes can be made in the present embodiment by one skilled in the art without departing from the spirit and scope of the present invention.

For a general description of the present invention reference is made to the drawings. The tractor of the present embodiment is of the four-wheeled rubber-tired type with a rear mounted engine. However, the present invention may also efficiently be used on other types of tractors such as a crawler tractor. Conventional boom and linkage means are provided operatively connected between the compound bucket and the tractor. The boom which provides the main support for the bucket may be raised and lowered at the forward end thereof about a transverse axis on the tractor. The linkage means which in the present embodiment comprises a hydraulic ram is used to pivot the bucket to different operative positions relative to the boom. The compound bucket of the present invention comprises a front or scoop portion and a rearward or moldboard section. The front bucket half is operatively connected to the rearward section or bucket half by a pair of links disposed one on each side of the bucket. Each link is pivotally connected between the lower side portion of the moldboard or forward end of the boom and the upper end of the scoop portion. A pair of hydraulic rams mounted one on each side of the bucket adjusts and maintains different angular positions of the scoop relative to the levers. Each of these hydraulic rams is pivotally connected between one of the levers intermediate the ends thereof and an extension arm of the upper portion of the scoop. As these hydraulic rams are contracted, the bucket is opened, and an extension thereof causes a closing of the two bucket halves. The bucket is pivotally carried on the boom by means of pins carried at the lower end of the moldboard section. The hydraulic rams of the linkage means are also pivotally connected to the moldboard at the rearward side edges thereof at a position substantially above the pivotal connection of the moldboard on the boom. Another pair of hydraulic rams are provided for pivoting and holding the lever in various tilted positions relative to the boom. Each of these rams is disposed on one side of the tractor and is pivotally interconnected between one of the boom arms intermediate the ends thereof and one of the levers intermediate the ends thereof. By different combinations of operation of the various described rams, all of the functions described above may be efficiently performed. Exactly how each material handling function is produced by the subject invention will be described below after a detailed description of the construction of the present invention.

For a detailed description of the present invention, continued reference is made to the drawings. The tractor comprises a frame 10 supported on wheels 11 and carrying an engine compartment 12 at the rearward end thereof and an operator's compartment 13 disposed forwardly thereof.

The bucket, boom and linkage means are identically constructed on each side of the tractor so that a description of one side thereof will suffice for a complete description. The boom 14 is pivotally mounted at one end thereof on the tractor by means of pivotal mounting means 15. The other end of the boom 14 extends forwardly of the tractor and carries the bucket thereon. The boom 14 is selectively raised and lowered by a hydraulic ram 16 which is pivotally connected at the head end thereof by means of a pin 18 to a flange 17 depending from the frame 10. The rod end of the hydraulic ram 16 is pivotally connected to the boom 14 intermediate the ends thereof by a pin arrangement 19.

The bucket of the present invention comprises a scoop 20 and a moldboard 21. The scoop 20 is somewhat U-shaped comprising a pair of spaced-apart side walls 41 interconnected by a bottom wall 22. The upper ends of the side walls 41 are provided with rearwardly and upwardly extending portions defining arms 23. The forward marginal edge of bottom wall 22 is provided with a cutting edge 24 and the rearward marginal edge of bottom wall 22 is provided with a cutting edge 25. The moldboard 21 comprises a curved plate 26 having side walls 27 secured at each end thereof. Reinforcing ribs (not shown) may be mounted on the rearward side of the moldboard 21 to provide sufficient rigidity thereof. The lower marginal edge of the curved plate 26 is provided with a cutting edge 28. The scoop 20 and the moldboard 21 are interconnected by a lever 29 which is pivotally connected at the lower end thereof to the lower end of the moldboard 21 and the forward end of the boom 14 by means of pivotal mounting means 30. The upper end of the lever 29 is pivotally connected to the upper portion of the scoop 20 by pin means 31. Thus it may be seen that scoop 20 is movable toward and away from moldboard 21 by a pivotal movement of lever 29 about pivotal mounting 30 and is angularly adjustable relative to moldboard 21 by a pivotal movement of scoop 20 about pin means 31. These two operations of the scoop 20 relative to the moldboard 21 are respectively controlled by hydraulic rams 32 and 33. It should be noted that the lever 29 and its mate on the other side of the machine are in a sense carriers for the scoop 20, and could also be combined to form a single carrier by further extending their upper ends and by securing a transverse member rigidly between those extended upper ends. Hydraulic ram 32 is pivotally connected at the head end thereof to the boom 14 intermediate the ends thereof by pivotal mounting means 34. The rod end of hydraulic ram 32 is pivotally connected to the lever 29 intermediate the ends thereof by pivotal mounting means 35. The head end of hydraulic ram 33 is pivotally connected to lever 29 by pivotal mounting means 35 and the rod end of hydraulic ram 33 is pivotally connected to the extension arm 23 of the scoop 20 by pivotal mounting means 36. As the hydraulic ram 32 is extended, the lever 29 is pivoted in a counterclockwise direction, as viewed in FIGURE 1, about pivotal mounting means 30, and with the opposite action occurring when hydraulic ram 32 is retracted. Scoop 20 is pivoted in a clockwise direction when hydraulic ram 33 is retracted and is moved in the opposite direction when hydraulic ram 33 is extended.

Hydraulic ram 37 is provided for pivoting and holding the moldboard 21 in different pivotal positions relative to the boom 14. The head end of hydraulic ram 37 is pivotally mounted on the tractor by pivotal mounting means 38. The rod end of the hydraulic ram 37 is pivotally connected to the moldboard 21 by pivotal mounting means 39. Thus it may be seen that as the hydraulic ram 37 is extended, the moldboard 21 is pivoted in a counterclockwise direction as viewed in FIGURE 1 about pivotal mounting means 30 and is moved in the opposite direction by a retraction of hydraulic ram 37. The hydraulic rams 16, 37, 32 and 33 of the present invention are of the double-acting type, and suitable hydraulic fluid conduits, pump, valve, and reservoir means (not shown) are provided for any selected operation or combination of operations of those hydraulic rams.

Figure 2:
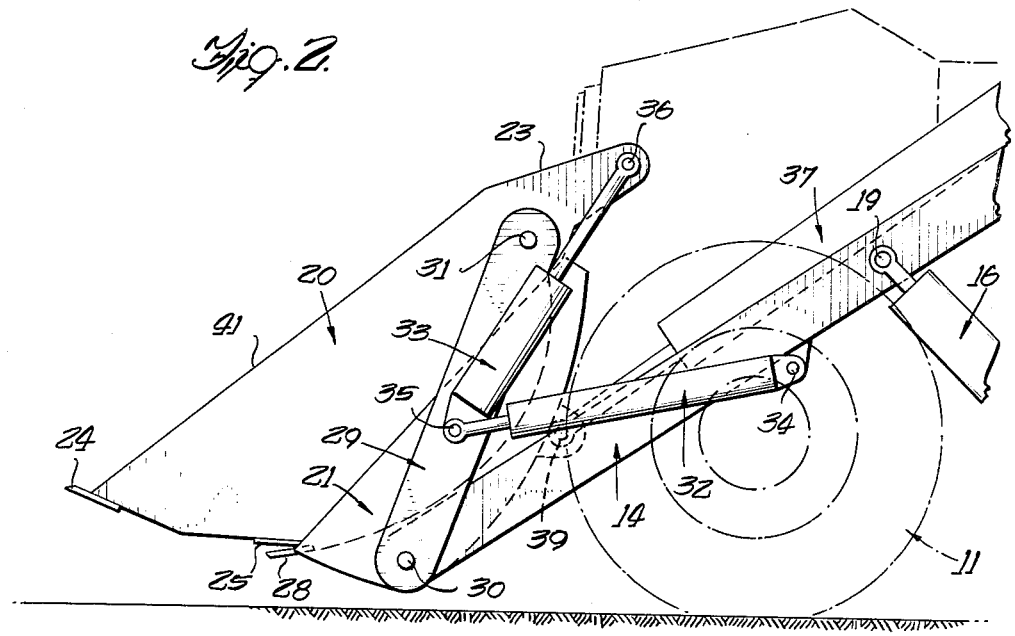
FIGURE 2 is a partial enlarged view of FIGURE 1 with the bucket adjusted to the breakout position.

Turning next to a description of the operation of the instant invention in order that the construction thereof may be more readily understood, continued reference is made to the drawings. When the hydraulic rams 16 are substantially retracted, with the hydraulic rams 33 substantially completely extended, with the hydraulic rams 32 partially extended, and with the hydraulic rams 37 partially extended, such as shown in FIGURE 1, the bucket is in the digging position at ground level. The scoop 20 and the moldboard 21 are closed to define a conventional bucket and digging will occur with the cutting edge 24 on the forward edge of the scoop 20. As the tractor is moved forwardly the cutting edge 24 will be forced into the material being worked, filling the bucket. The bucket may then be operated to the breakout position shown in FIGURE 2, breaking away the load in the bucket from the material being worked and further disposing the bucket at a somewhat load scooping angle. As may be seen in FIGURE 2, the position attained therein is reached by a simultaneous retraction of hydraulic rams 32 and 37. The simultaneous retraction of these rams will cause a pivoting of the scoop 20 and the moldboard 21 together as a unit rearwardly about the axis of pivotal mounting means 30.

Figure 3:
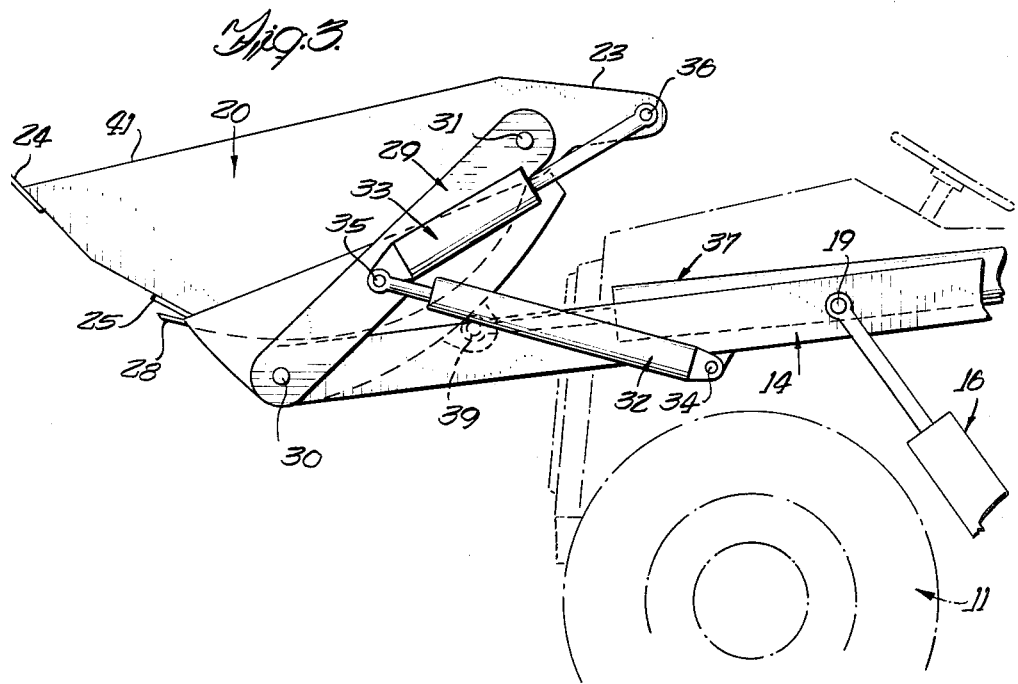
FIGURE 3 is a partial enlarged view of the structure of FIGURE 1 with the bucket adjusted to one load carrying position.

If the boom raising and lowering rams 16 are then partially extended to a position such as shown in FIGURE 3, the bucket will further be moved through the load in a scooping action to a load carrying position. Because of the horizontal displacement of the axes of the pivotal mounting means 15 and 38 and because of the vertical displacement of the pivot axes of the pivotal mounting means 30 and 39, the bucket is automatically tilted further rearwardly to a full load retention position.

If the hydraulic rams 16 are further extended to a position such as shown in FIGURE 4, the bucket, while remaining in substantially full load retention position, will be further raised to the high lift carrying position shown therein.

From the high lift carrying position, hydraulic rams 32 and 37 may be substantially completely extended to a position such as shown in FIGURE 5 to pivot the bucket about pivotal mounting means 30 to a dump position.

The dump position shown in FIGURE 5 will produce substantial emptying of the bucket of most granular materials.

A second dump position, which is attained from the position shown in FIGURE 5 by a substantial retraction of the hydraulic rams 33 is shown in FIGURE 6. In this position the scoop 20 is pivoted clockwise to open the bucket permitting the load to easily drop therefrom. As an aid to the dumping of sticky materials, the hydraulic rams 33 may be rapidly extended and retracted to jar the sticky materials from the bucket.

The above described operations generally relate to those commonly used in conventional loader operation. An example of the further versatility of the present invention is shown in FIGURE 7 wherein a bulldozing arrangement is provided. To provide for bulldozer operation, the hydraulic rams 37 are retracted slightly from the position shown in FIGURE 1, and the boom raising and lowering rams 16 are slightly retracted to provide a conventional bulldozer cutting arrangement for the moldboard 21. Further, the hydraulic rams 32 are slightly extended and the hydraulic rams 33 are substantially completely retracted to raise the scoop 20 out of the path of bulldozing. The moldboard 21 with its cutting edge 28 is then properly disposed for use in a bulldozing operation.

To provide for a clam shell type operation of the present invention, the hydraulic rams 33 are substantially completely retracted, the hydraulic rams 37 are substantially extended and the hydraulic rams 32 are substantially completely extended. The hydraulic rams 16 are slightly extended to properly position the cutting edge 28 of the moldboard 21 and the cutting edge 25 of the scoop 20 on the ground or in the horizontal plane in which the closing of the clam shell is desired. Because of the relatively great horizontal distance between the cutting edges 25 and 28, a substantial reach is provided for spanning a pile of material to be cut into the bucket by the clam shell action. The clam shell action will occur by a simultaneous extension of hydraulic rams 33 and retraction of hydraulic rams 32 to thereby close the bucket.

The present invention may also be used as a self-loading scraper by operation of the various rams to position the bucket such as substantially shown in FIGURE 9. For a self-loading scraper action, the hydraulic rams 37 are slightly extended to bring the cutting edge 28 into a proper scraping position, and the hydraulic rams 32 and 33 are respectively slightly extended and slightly retracted to provide an ideal opening between the rearward marginal edges of the scoop 20 and the moldboard 21 and to provide proper clearance of the bottom wall 22 of the scoop 20. As the tractor is moved forwardly, the cutting edge 28 will cut into the ground, and as the tractor proceeds will boil the cut material into the space defined by the scoop 20 and the moldboard 21.

From the above it may be seen that the present invention provides an extremely versatile material handling tool which by variations in the described operations may also be used for spreading, backfilling, leveling, grading and backhoeing.

Having described the invention, what is considered new and desired to be protected by Letters Patent is:

1. In tractor loader, a boom carried thereon and extending forwardly thereof, a two-piece bucket comprising a front scoop portion and a rear moldboard portion, means pivotally mounting said moldboard portion on said boom, linkage means connected between said tractor and said moldboard portion for pivoting said moldboard portion relative to said boom, second linkage means connected to said boom and to said scoop portion to carry said scoop portion independently of said moldboard portion and to pivot said scoop portion relative to said boom, third linkage means connected to said second linkage means and said scoop portion for pivoting said scoop portion relative to said moldboard portion.

2. In a tractor loader, a boom carried thereon and extending forwardly thereof, a two-piece bucket comprising a front scoop portion and a rear moldboard portion, means pivotally mounting said moldboard portion at the lower rear side thereof on the forward end of said boom, adjustable linkage means connected between said tractor and said moldboard portion above the pivotal connection thereof on said boom for pivoting said moldboard portion relative to said boom, second adjustable linkage means connected to said boom substantially at the pivotal connection of said moldboard on said boom and to said scoop portion substantially at the upper end thereof to carry said scoop portion independently of said moldboard portion and for permitting pivoting of said scoop portion about substantially the same axis on said boom that said moldboard portion is pivoted, and third adjustable linkage means connected to said second adjustable linkage means and to said scoop portion substantially at the upper end thereof for pivoting said scoop portion relative to said moldboard portion.

3. In a tractor loader, a boom pivotally carried at one end thereof on said tractor and extending forwardly thereof, power operated means for raising and lowering said boom, a two-piece bucket comprising a front scoop portion and a rear moldboard portion, means pivotally mounting said moldboard portion at the lower end thereof on the forward end of said boom, second power operated means connected between said moldboard portion above the connection thereof to said boom and said tractor for pivoting said moldboard portion relative to said boom, lever means pivotally connected at one end thereof to said boom at the forward end thereof, means pivotally connecting said lever means at the other end thereof to the upper end of said scoop portion, said scoop portion further being formed to have an arm extending rearwardly of the connection of said lever means to said scoop portion, third power operated means connected between said lever means intermediate the ends thereof and the end of said arm on said scoop portion for pivoting said scoop portion relative to said lever means, and fourth power operated means connected between said lever means intermediate the ends thereof and said boom intermediate the ends thereof for pivoting said lever means relative to said boom.

4. In a tractor loader as claimed in claim 3 wherein the pivotal axis of said lever means on said boom and said moldboard on said boom are positioned to coincide, and wherein the pivotal axes of said third and fourth power operated means on said lever means are positioned to coincide.

5. In a tractor loader, a boom pivotally carried at one end thereof on said tractor and extending forwardly thereof, a two-piece bucket comprising a front scoop shaped portion and a rear moldboard portion, means pivotally mounting said rear portion on the forward end of said boom, lever means pivotally connected to said boom at the forward end thereof, means pivotally connecting said lever means to said front portion, power operated means for raising and lowering said boom, second power operated means connected between said tractor and said rear portion for pivoting said rear portion relative to said boom, third power operated means connected between said boom and said lever means for pivoting said lever means and said front portion relative to said boom, fourth power operated means pivotally connected between said lever means and said scoop for pivoting said scoop relative to said lever means.

6. In a tractor loader, a boom pivotally carried at one end thereof on said tractor and extending forwardly thereof, a two-piece bucket comprising a front scoop portion and a rear moldboard portion, carrier means for said scoop portion, means pivotally mounting said carrier means and said moldboard portion on the forward end of said boom for pivotal movement thereof about the same axis on said boom transversely of the tractor, power operated means connected between said moldboard portion above the pivotal axis of said moldboard portion on said boom and said tractor for pivoting said moldboard portion relative to said boom, means pivotally connecting said carrier means to the upper portion of said scoop portion, and second power operated means connected between said boom, said carrier means, and said scoop portion, the connection of said second power operated means to said boom being intermediate the ends of said boom, the connection of said second power operated means to said carrier being between the pivotal axis of said carrier on said boom and the pivotal axis of said carrier to said scoop portion, the connection of said second power operated means to said scoop portion being rearwardly and above the pivotal axis of said carrier means thereto for pivoting said scoop portion relative to said boom about one axis and for pivoting said scoop portion relative to said carrier means about a different axis.

7. In a tractor loader, a boom pivotally carried at one end thereof on said tractor and extending forwardly thereof, a two-piece bucket comprising a front scoop portion and a rear moldboard portion, carrier means for said scoop portion, means pivotally mounting said carrier means and said moldboard portion on the forward end of said boom for pivotal movement thereof about the same axis on said boom transversely of the tractor, power operated means connected between said moldboard portion above the pivotal axis of said moldboard portion on said boom and said tractor for pivoting said moldboard portion relative to said boom, means pivotally connecting said carrier means to the upper portion of said scoop portion, second power operated means connected between said boom intermediate the ends thereof and to said carrier for pivoting said scoop portion relative to said boom about the pivotal axis of said carrier means on said boom, and third power operated means connected between said scoop portion rearwardly and above the pivotal axis of said carrier means thereto and to said carrier means between the pivotal axis of said carrier means on said boom and the pivotal axis of said carrier means on said scoop portion for pivoting said scoop portion relative to said carrier means.

8. In a tractor loader as claimed in claim 7, wherein the pivotal axes of said second and third power operated means on said carrier means are positioned to substantially coincide.

9. In a tractor loader including a tractor-mountable boom having a tool-carrying forward end portion; a bucket comprising a rearward component in the form of moldboard and a forward component in the form of a scoop, the moldboard having a lower portion with a horizontal cutting edge extending transversely of the boom, means pivotally mounting the moldboard lower portion on the boom end portion to facilitate selective tilting of the moldboard about a first horizontal axis extending transversely of the boom, the scoop having a bottom portion with oppositely disposed relatively forward and rearward cutting edges extending horizontally transversely of the boom, the scoop also having opposite side walls rising from the bottom wall and providing upper portions of such side walls, means for interconnecting the scoop and moldboard including a lever means having a lower portion pivotally mounted on the boom coaxially with the first horizontal axis and an upper portion pivotally connected with the scoop side wall upper portions for relative pivoting about a second horizontal axis parallel with the first axis, and extensible control means connected to the lever means, the boom, and to the scoop and operable to swing the lever means about the first axis and to swing the scoop about the second axis.

10. In a tractor loader including a boom attached to the tractor and extending forwardly therefrom, a material handling tool comprising: a bucket having a rear moldboard portion with a top and a bottom, and a front scoop portion with a top and a bottom; a cutting edge secured to the bottom of said moldboard portion; a pair of spaced cutting edges secured to the bottom of said scoop portion; means pivotally connecting the bottom of said moldboard portion to the boom forwardly of the tractor; lever means movably connecting the bottom of said moldboard portion to the top of said scoop portion permitting pivotal movement of said scoop portion relative to said moldboard portion; first extensible means pivotally connected at one end to the tractor and at the other end to the moldboard portion to provide pivotal movement of the moldboard portion relative to the boom; second extensible means pivotally connected at one end to the boom and at the other end to said lever means to provide pivotal movement of the scoop portion relative to the boom; and third extensible means pivotally connected at one end to the top of the scoop portion and at the other end to the lever means coincident with the connection of said other end of said second extensible means with said lever means thereby providing pivotal movement of said scoop portion relative to said lever means, whereby said first, second and third extensible means may be adjusted to form said material handling tool from said moldboard portion and said scoop portion individually or in cooperation with one another.

References Cited by the Examiner

UNITED STATES PATENTS

| | | | |
|---|---|---|---|
| 2,470,779 | 5/49 | Lankovski | 214—145 |
| 2,812,595 | 11/57 | Drott | 214—147 X |
| 2,881,932 | 4/59 | Schwing | 214—147 |
| 3,148,465 | 9/64 | Beyerstedt | 37—117.5 |

BENJAMIN HERSH, *Primary Examiner.*

HUGO SCHULZ, *Examiner.*